United States Patent [19]

Kuwahara

[11] Patent Number: 5,215,169
[45] Date of Patent: Jun. 1, 1993

[54] EDDY CURRENT BRAKING SYSTEM

[75] Inventor: Tohru Kuwahara, Kanagawa, Japan

[73] Assignee: Isuzu Motors Ltd., Tokyo, Japan

[21] Appl. No.: 733,139

[22] Filed: Jul. 19, 1991

[30] Foreign Application Priority Data

Jul. 30, 1990 [JP] Japan ................................. 2-201819

[51] Int. Cl.$^5$ ............................................... B60L 7/00
[52] U.S. Cl. ................................. 188/164; 188/158; 310/105
[58] Field of Search ............... 188/158, 159, 161, 164; 310/105, 93

[56] References Cited

U.S. PATENT DOCUMENTS 3,488,535  1/1970  Baermann ........................... 310/105
4,482,034 11/1984  Boermann ........................... 188/165

FOREIGN PATENT DOCUMENTS 0367387  5/1990  European Pat. Off. .............. 310/93
234044  9/1989  Japan .
298947 12/1989  Japan .

Primary Examiner—Robert J. Oberleitner
Assistant Examiner—Chris Schwartz
Attorney, Agent, or Firm—John E. Toupal; Harold G. Jarcho

[57] ABSTRACT

A vehicle braking system including a brake disk structure defining an annular surface and having an axis; an annular magnet support assembly disposed adjacent to the annular surface in the direction of the axis; a plurality of circumferentially spaced apart pairs of circumferentially spaced apart magnets mounted on the magnet support and circumferentially spaced apart thereon, each pair arranged with like polarities facing the annular surface and the polarities of the pairs of permanent magnets facing the annular surface alternating circumferentially; an annular pole piece support assembly; and a plurality of ferromagnetic pole pieces mounted on the pole piece support assembly and circumferentially spaced apart in positions between the annular surface and the permanent magnets, each pole piece disposed adjacent to a pair of the permanent magnets and having a circumferential length substantially greater than the circumferential length of either of the adjacent pair of permanent magnets. Also included in the system is an adjustment mechanism for producing relative angular movement between the magnet support and the pole piece support assembly so as to change the circumferential alignment between each of the pole pieces and the pair of permanent magnets adjacent thereto.

16 Claims, 2 Drawing Sheets

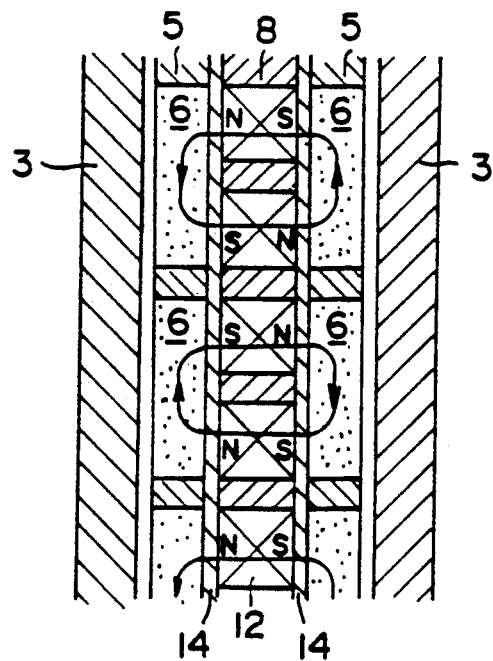
F I G. 3
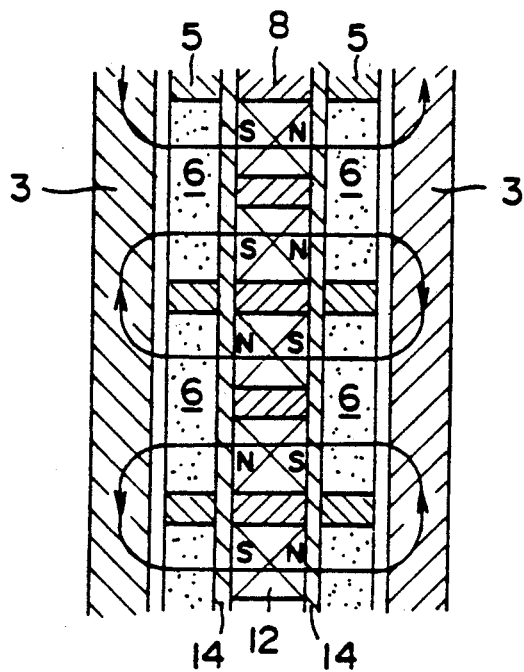
F I G. 4

EDDY CURRENT BRAKING SYSTEM

BACKGROUND OF THE INVENTION

This invention relates generally to a braking system for use principally on a large vehicle and, more particularly, to an eddy-current type retarder for assisting a friction brake.

In Japanese Patent Laid-open Publication No. 298947/1989, there is disclosed a braking system in which a pair of control plates is rotatably arranged between a pair of brake disks connected to a rotational shaft and a magnet support disk is disposed between the control plates. The magnet support disk supports a plurality of permanent magnets circumferentially spaced at a uniform pitch and with alternating polarities. Retained by the control plates are circumferentially spaced apart ferromagnetic pole pieces having lengths substantially the same as those of the permanent magnets.

When the control plates position each of the pole pieces directly adjacent to one of the permanent magnets, magnetic flux is circulated from the permanent magnets through the ferromagnetic pole pieces to the brake disks. Consequently, an eddy current is generated in the brake disks which receive braking torque.

When the control plates position each of the pole pieces uniformly adjacent to a pair of adjacent permanent magnets a magnetic closed circuit is formed between the adjacent permanent magnets and the pole piece aligned therewith. Consequently, the magnetic field applied to the brake disks becomes extremely small and braking torque on the brake disks is substantially eliminated.

However, in the above braking system a problem is presented by magnetic flux that leaks from the center portions of the permanent magnets, not covered by an adjacent ferromagnetic pole piece. That leakage flux acts on the brake disks producing undesirable dragging torque. If the thickness of the control plates is increased in order to minimize leakage magnetic flux from the permanent magnets to the brake disks, the entire device increases in weight, and spacing between the permanent magnets and brake disks becomes greater. Therefore, magnetic flux circulated by the ferromagnetic pole pieces to the brake disks is reduced and braking torque is diminished.

Disclosed in Japanese Patent Laid-open Publication No. 234044/1989 is another eddy current type braking system in which two permanent magnets of opposite polarity are sandwiched between a pair of ferromagnetic plates during non-braking periods to form short-circuited magnetic closed circuits. In the disclosed system leakage magnetic flux is reduced. However, the arrangement of the ferromagnetic plates and the permanent magnets is irregular with spacing and pitch that are coarse and dense. Consequently, braking torque per unit area received by the brake disks during braking periods is relatively small.

The object of the invention, therefore, is to provide an improved eddy current type retardation device which without increased weight substantially eliminates magnetic leakage flux during non-braking periods and generates high braking torque during braking periods.

SUMMARY OF THE INVENTION

The invention is a vehicle braking system including a brake disk structure defining an annular surface means and having an axis; an annular magnet support assembly disposed adjacent to the annular surface means in the direction of the axis; a plurality of circumferentially spaced apart pairs of circumferentially spaced apart permanent magnets mounted on the magnet support and circumferentially spaced apart thereon, each pair arranged with like polarities facing the annular surface means and the polarities of the pairs of permanent magnets facing the annular surface means alternating circumferentially; an annular pole piece support assembly; and a plurality of ferromagnetic pole pieces mounted on the pole piece support assembly and circumferentially spaced apart in positions between the annular surface means and the permanent magnets, each pole piece disposed adjacent to a pair of the permanent magnets and having a circumferential length substantially greater than the circumferential length of either of the adjacent pair of permanent magnets. Also included in the system is an adjustment mechanism for producing relative angular movement between the magnet support and the pole piece support assembly so as to change the circumferential alignment between each of the pole pieces and the pair of permanent magnets adjacent thereto. Selective braking and non-braking periods are established by changing the alignment between the pole pieces and magnets.

According to one feature of the invention, the pole piece support provides non-magnetic gaps between the circumferentially spaced apart pole pieces. The gaps facilitate the application of a magnetic field to the brake disk structure during braking periods.

According to another feature of the invention, the adjustment mechanism is adapted to provide alternately a braking condition in which each magnet pair is aligned with an adjacent pole piece and a non-braking condition in which the permanent magnets in each pair straddle one of the gaps. These arrangements establish, respectively, a magnetic circuit including the brake disc and one excluding the brake disc.

According to yet another feature of the invention, the circumferential length of each pole piece is substantially equal to the combined circumferential lengths of the adjacent pair of permanent magnets and the spacing therebetween. This arrangement allows the pole pieces to fully shield the brake disk structure from leakage magnetic flux during non-braking periods.

According to still other features of the invention, the annular surface means comprises axially spaced apart, substantially parallel first and second annular planar surfaces, the pole piece support assembly comprises axially spaced apart annular first and second plates each supporting a plurality of the pole pieces, the first and second surfaces straddling the first and second plates; and the first and second plates straddle the magnet support assembly. This arrangement facilitates use of the invention with a conventional disk brake structure.

According to a further feature of the invention, the magnet support assembly provides non-magnetic gaps between each pair of circumferentially adjacent permanent magnets of unlike polarity. The non-magnetic gaps prevent magnetic shorting of the adjacent magnets.

DESCRIPTION OF THE DRAWINGS

These and other objects and features of the invention will become more apparent upon a perusal of the following description taken in conjunction with the accompanying drawings wherein:

FIG. 3 is a developed plan sectional view, showing the relationship between ferromagnetic plates and permanent magnets during non-braking periods; and FIG. 4 is a developed plan sectional view, showing the relationship between ferromagnetic plates and permanent magnets during braking periods.

DESCRIPTION OF THE PREFERRED EMBODIMENT

Figure 1:
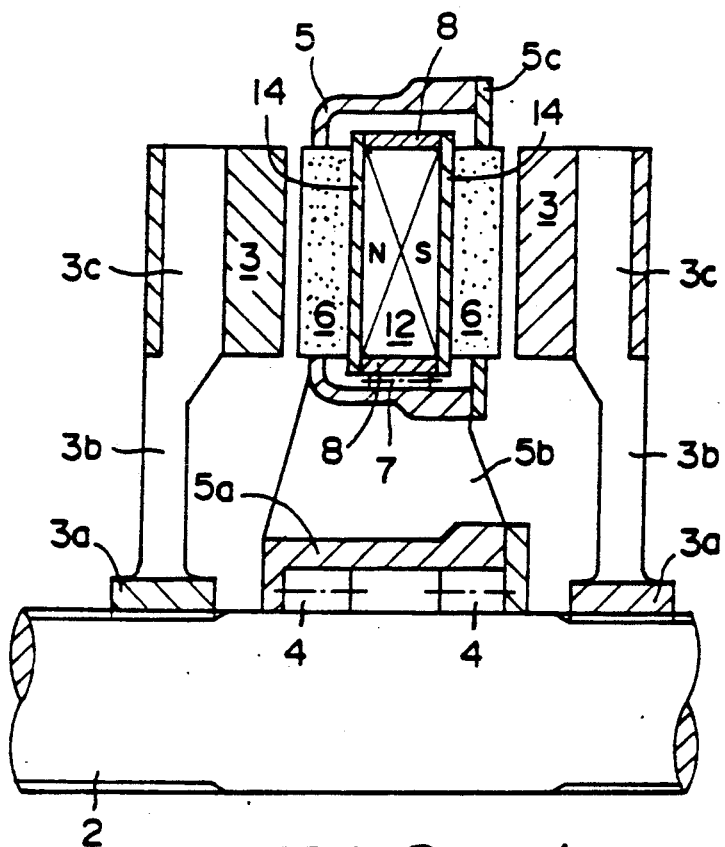
FIG. 1 is a front sectional view of an eddy current type retardation device according to the present invention.

An eddy current type retardation braking system according to the present invention comprises a pair of brake disks 3 formed of magnetically conductive material and connected to an output rotational shaft 2 of a transmission (not shown) or a speed change gear (not shown) of a vehicle. The disks form annular, first and second parallel planar surfaces separated along an axis. A fixed frame 5 formed of non-magnetic material is arranged between the brake disks 3, and an annular magnet support disk 8 is rotatably supported within an annular chamber formed by the fixed frame 5. Supporting the brake disks 3 are bosses 3a secured to the rotational shaft 2 by a spline. Preferably, the bosses 3a and spokes 3b with vent passages 3c extending radially between the bosses 3a and the brake disks 3 are integrally formed by casting.

The fixed frame 5 is of an annular cylindrical shape and forms an annular chamber of a rectangular section. More specifically, an annular cylindrical body having a C-shaped section is covered with an annular cover plate 5c. The fixed frame 5 is formed integrally with spokes 5b extending radially from a boss 5a supported on the rotational shaft 2 by means of bearings 4. Preferably, the fixed frame 5 is secured to a gear box wall of the transmission (not shown) by suitable means not shown. A number of ferromagnetic pole piece plates 6 are circumferentially spaced apart at a uniform pitch on both side wall plates of the fixed frame 5 which provides non-magnetic gaps between the pole pieces 6. Preferably, the ferromagnetic plates 6 are embedded when the fixed frame 5 is molded.

An annular magnet support disk 8 formed of non-magnetic material is rotatably supported by means of a bearing 7 in the annular chamber formed by the fixed frame 5. A number of permanent magnets 12 are circumferentially spaced apart at a uniform pitch on the magnet support disk 8. Preferably, the permanent magnets 12 are cast into the magnet support disk 8. Immersed in a lubricating oil are a pair of thin slide plates 14 sandwiched in sliding contact between side walls of the magnet support disk 8 and the ferromagnetic plates 6.

Figure 2:
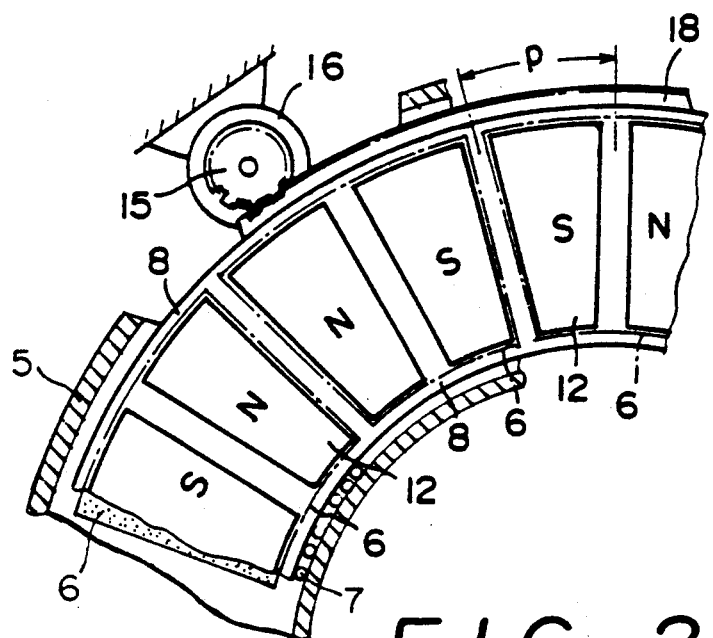
FIG. 2 is a side sectional view of a magnet support ring according to the present invention.

As shown in FIG. 2, the magnet support disk 8, which is formed of non-magnetic material such as aluminum, supports a plurality of sectorial permanent magnets 12. A pinion 15 of an electric motor 16 secured to the fixed frame 5 is meshed with an arcuate rack gear 18 formed on the outer peripheral wall of the magnet support disk 8. Rotation of the magnet support disk 8 produces angular movement of the magnets 12 relative to the pole pieces 6 so as to vary the alignment therebetween.

As shown in FIGS. 3 and 4, the permanent magnets 12 include circumferentially spaced apart pair of magnets arranged with like polarities facing the annular planar surfaces of the brake disks 3. The polarities of the magnet pairs facing the adjacent brake disks alternate circumferentially on the support disk 8, as shown. Also, each pole piece 6 has a circumferential length substantially greater than those of the magnets 12 and preferably equal to the combined lengths of a pair of adjacent magnets and a non-magnetic gap therebetween as also shown in FIGS. 3 and 4.

OPERATION

During non-braking periods, the support disk 8 is rotated relative to the straddling plates of the fixed frame 5 into a position wherein the non-magnetic gap between each pair of adjacent pole pieces 6 is straddled by a pair of like polarity magnets 12 as shown in FIG. 3. With this arrangement a magnetic closed circuit is created between circumferentially adjacent magnets of opposite polarity and axially aligned pairs of ferromagnetic plates 6. Consequently, the brake disks 3 are not affected by a magnetic field. Since each of the ferromagnetic plates 6 completely isolates one of the brake disks 3 from two circumferentially adjacent magnets 12, leakage magnetic flux is substantially eliminated and the brake disks 3 are not subjected to dragging torque.

During braking periods, the magnet support disk 8 is rotated into a position wherein each pair of like polarity magnets 12 is axially aligned with an adjacent pair of the pole pieces 6 as shown in FIG. 4. With this arrangement, circumferentially adjacent magnets 12 of opposite polarity apply a magnetic field to the brake disks 3 via adjacent pairs of the ferromagnetic plates 6 as shown. When the rotating brake disks 3 cross the magnetic field, eddy current occurs and the brake disks 3 receive braking torque.

Obviously, many modifications and variations of the present invention are possible in light of the above teachings. For example, while in the above-described embodiment, the magnet support disc 8 is alternately rotated to change the angular positions of the permanent magnets 12 relative to the pole pieces 6, it is to be noted that the magnet support disk also could be rotated by a fluid pressure actuator or the magnet support disk 8 could be fixed and the frame 5 could be rotated to provide relative angular displacement between the pole pieces 6 and the magnets 12. It is to be understood, therefore, that the invention can be practiced otherwise than as specifically described.

What is claimed is:

1. A vehicle braking system comprising:
   brake disk means defining annular surface means having an axis;
   annular magnet support means disposed adjacent to said annular surface means in the direction of said axis;
   a plurality of pairs of permanent magnets mounted on said magnet support means and circumferentially spaced apart thereon at a uniform pitch, each said pair having directly adjacent spaced apart permanent magnets arranged with like polarities facing said annular surface means and wherein in each said pair the polarity facing said annular surface is opposite to that of each directly adjacent pair;
   annular pole piece support means;
   a plurality of ferromagnetic pole pieces of uniform length and mounted on said pole piece support means and circumferentially spaced apart at a uniform pitch and in positions between said annular surface means and said permanent magnets, each said pole piece disposed adjacent to a pair of said permanent magnets and having a circumferential length substantially greater than the circumferential length of either of said permanent magnets in each said pair; and adjustment means for producing relative angular movement between said magnet support means and said pole piece support means so as to change the circumferential alignment between each of said pole pieces and said pair of permanent magnets adjacent thereto.

2. A braking system according to claim 1 wherein said pole piece support means provides non-magnetic gaps between said circumferentially spaced apart pole pieces.

3. A braking system according to claim 2 wherein said adjustment means is adapted to provide alternately a braking condition in which each said pair is aligned with said adjacent pole piece and a non-braking condition in which said permanent magnets in each said pair straddle one of said gaps.

4. A braking system according to claim 3 wherein said circumferential length of each said pole piece is substantially equal to the combined circumferential lengths of said adjacent pair of permanent magnets and the spacing therebetween.

5. A braking system according to claim 1 wherein said annular surface means comprises axially spaced apart, substantially parallel first and second annular planar surfaces; said pole piece support means comprises axially spaced apart annular first and second plates each supporting a plurality of said pole pieces, said first and second surfaces straddling said first and second plates; and said first and second plates straddle said magnet support means.

6. A braking system according to claim 5 wherein said pole piece support means provides non-magnetic gaps between said, circumferentially spaced apart pole pieces.

7. A braking system according to claim 6 wherein said adjustment means is adapted to provide alternately a braking condition in which each said pair is aligned with said adjacent pole piece and a non-braking condition in which said permanent magnets in each said pair straddle one of said gaps.

8. A braking system according to claim 7 wherein said circumferential length of each said pole piece is substantially equal to the combined circumferential lengths of said adjacent pair of permanent magnets and the spacing therebetween.

9. A braking system according to claim 5 wherein said magnet support means provides non-magnetic gaps between each pair of circumferentially adjacent permanent magnets of unlike polarity.

10. A braking system according to claim 9 wherein said pole piece support means provides non-magnetic gaps between said circumferentially spaced apart pole pieces.

11. A braking system according to claim 10 wherein said adjustment means is adapted to provide alternately a braking condition in which each said pair is aligned with said adjacent pole piece and a non-braking condition in which said permanent magnets in each said pair straddle one of said gaps.

12. A braking system according to claim 11 wherein said circumferential length of each said pole piece is substantially equal to the combined circumferential lengths of said adjacent pair of permanent magnets and the spacing therebetween.

13. A braking system according to claim 9 wherein said magnet support means comprises a magnet support disk disposed between said first and second plates and said first and second surfaces.

14. A braking system according to claim 13 wherein said pole piece support means provides non-magnetic gaps between said circumferentially spaced apart pole pieces.

15. A braking system according to claim 14 wherein said adjustment means is adapted to provide alternately a braking condition in which each said pair is aligned with said adjacent pole piece and a non-braking condition in which said permanent magnets in each said pair straddle one of said gaps.

16. A braking system according to claim 15 wherein said circumferential length of each said pole piece is substantially equal to the combined circumferential lengths of said adjacent pair of permanent magnets and the spacing therebetween.

* * * * *